United States Patent [19]

Bi et al.

[11] Patent Number: 5,952,125
[45] Date of Patent: Sep. 14, 1999

[54] BATTERIES WITH ELECTROACTIVE NANOPARTICLES

[75] Inventors: Xiangxin Bi, Pleasanton; Nobuyuki Kambe, Menlo Park; Sujeet Kumar, Fremont; James T. Gardner, Cupertino, all of Calif.

[73] Assignee: NanoGram Corporation, Fremont, Calif.

[21] Appl. No.: 08/897,776

[22] Filed: Jul. 21, 1997

[51] Int. Cl.[6] .............................. H01M 4/48; H01M 4/04
[52] U.S. Cl. ........................................................ 429/231.2
[58] Field of Search ......................................... 429/231.2

[56] References Cited

U.S. PATENT DOCUMENTS

| | | | |
|---|---|---|---|
| 3,483,110 | 12/1969 | Rozgonyi | 204/192 |
| 4,576,883 | 3/1986 | Hope et al. | |
| 4,675,260 | 6/1987 | Sakurai et al. | |
| 5,225,297 | 7/1993 | Garcia-Alvarado et al. | |
| 5,366,830 | 11/1994 | Koksbang | |
| 5,437,943 | 8/1995 | Fujii et al. | 429/192 |
| 5,443,809 | 8/1995 | Olsen | |
| 5,512,214 | 4/1996 | Koksbang | |
| 5,514,496 | 5/1996 | Mishima et al. | 429/218 |
| 5,545,496 | 8/1996 | Chang et al. | |
| 5,549,880 | 8/1996 | Koksbang | 423/593 |
| 5,567,548 | 10/1996 | Walk et al. | |
| 5,589,300 | 12/1996 | Fauteux et al. | 429/218 |

OTHER PUBLICATIONS

Abraham et al., J. Electrochem. Soc., vol. 128, No. 12, pp. 2493–2501 (Dec. 1981).
Baddour et al., J. Electroanal. Chem., vol. 314, pp. 81–101 (1991) No Month.
Bae et al., Solid State Ionics, vol. 90, pp. 251–260 (1996) No Month.
Barker et al., Electrochimica Acta, vol. 40, No. 8, pp. 949–952 (1995) No Month.
Bates et al., The Electrochemical Society Proceedings, vol. 94–28, pp. 342–347 No Month.
Hibino et al., Solid State Ionics, vol. 79, pp. 239–244 (1995) No Month.
Lampe–Onnerud, et al., J. Electrochem. Soc., vol. 142, No. 11, pp. 3648–3651 (Nov. 1995).
Le et al., J. Electrochem. Soc., pp. 0809–0810 1996.
Macklin et al., Electrochimica Acta, vol. 37, No. 9, pp. 1715–1720 (1992) No Month.
Miura et al., Denki Kagaku, Communication, vol. 59, No. 3, pp. 252–253 (1991).
Miura et al., Denki Kagaku, vol. 59, No. 2, pp. 149–151 (1991).
Munshi et al., Solid State Ionics, vol. 26, pp. 41–46 (1988).
West et al., Electrochimica Acta, vol. 28, No. 12, pp. 1829–1833 (1983) No Month.
D. W. Murphy, Intercalation Chemistry, Chapter 17, pp. 563–572, copyright 1982 by Academic Press, Inc. No Month.
Murphy et al., J. Electrochem. Soc., vol. 126, No. 3, pp. 497–499 (Mar. 1979).
Pasquali et al., J. Electrochem. Soc., vol. 133, No. 12, pp. 2454–2458 (Dec. 1986).

(List continued on next page.)

*Primary Examiner*—Maria Nuzzolillo
*Assistant Examiner*—Carol Chaney
*Attorney, Agent, or Firm*—Westman, Champlin & Kelly, P.A.; Peter S. Dardi

[57] ABSTRACT

Batteries based on nanoparticles are demonstrated that achieve high energy densities. Vanadium oxide nanoparticles can have several different stoichiometries and corresponding crystal lattices. The nanoparticles preferably have average diameters less than about 500 nm and more preferably less than about 150 nm. Cathodes produced using the vanadium oxide nanoparticles and a binder can be used to construct lithium batteries or lithium ion batteries. The nanoparticles may have energy densities greater than about 900 Wh/kg.

24 Claims, 11 Drawing Sheets

OTHER PUBLICATIONS

Passerini et al., The Electrochemical Society Proceedings, vol. 94–28, pp. 297–303 1994 (Month Not Available).

Saidi et al., Solid State Ionics, vol. 78, pp. 169–173 (1995) No Month.

Shodai et al., The Electrochemical Society Proceedings, vol. 94–28, pp. 224–232, 1994 (No Month Available).

Shodai et al., J. Electrochem. Soc., vol. 141, No. 10, pp. 2611–2614 (Oct. 1994).

Tipton et al., J. Electrochem. Soc., vol. 143, No. 11, pp. 3473–3477 (Nov. 1996).

Ugaji et al., J. Electrochem. Soc., vol. 142, No. 11, pp. 3664–3668 (Nov. 1995).

West et al., J. Electrochem. Soc., vol. 143, No. 3, pp. 820–825 (Mar. 1996).

West et al., Electrochimica Acta., vol. 38, No. 9, pp. 1215–1220 (1993) No Month.

West et al., Journal of Power Sources, vol. 20, pp. 165–172 (1987) No Month.

Pistoia et al., Journal of Power Sources, vol. 27, pp. 35–43 (1989) No Month.

Pistoia et al., J. Electrochem. Soc., vol. 137, No. 8, pp. 2365–2370 (Aug. 1990).

Chaput et al., "Synthesis and Characterization of Vanadium Oxide Aerogels", J. of Non–Crystalline Soilds, vol. 188, pp. 11–18 No Month Available 1995.

Linden, "Handbook of Batteries and Fuel Cells", McGraw–Hill, pp. 3–2 through 3–17 No Month Available 1984.

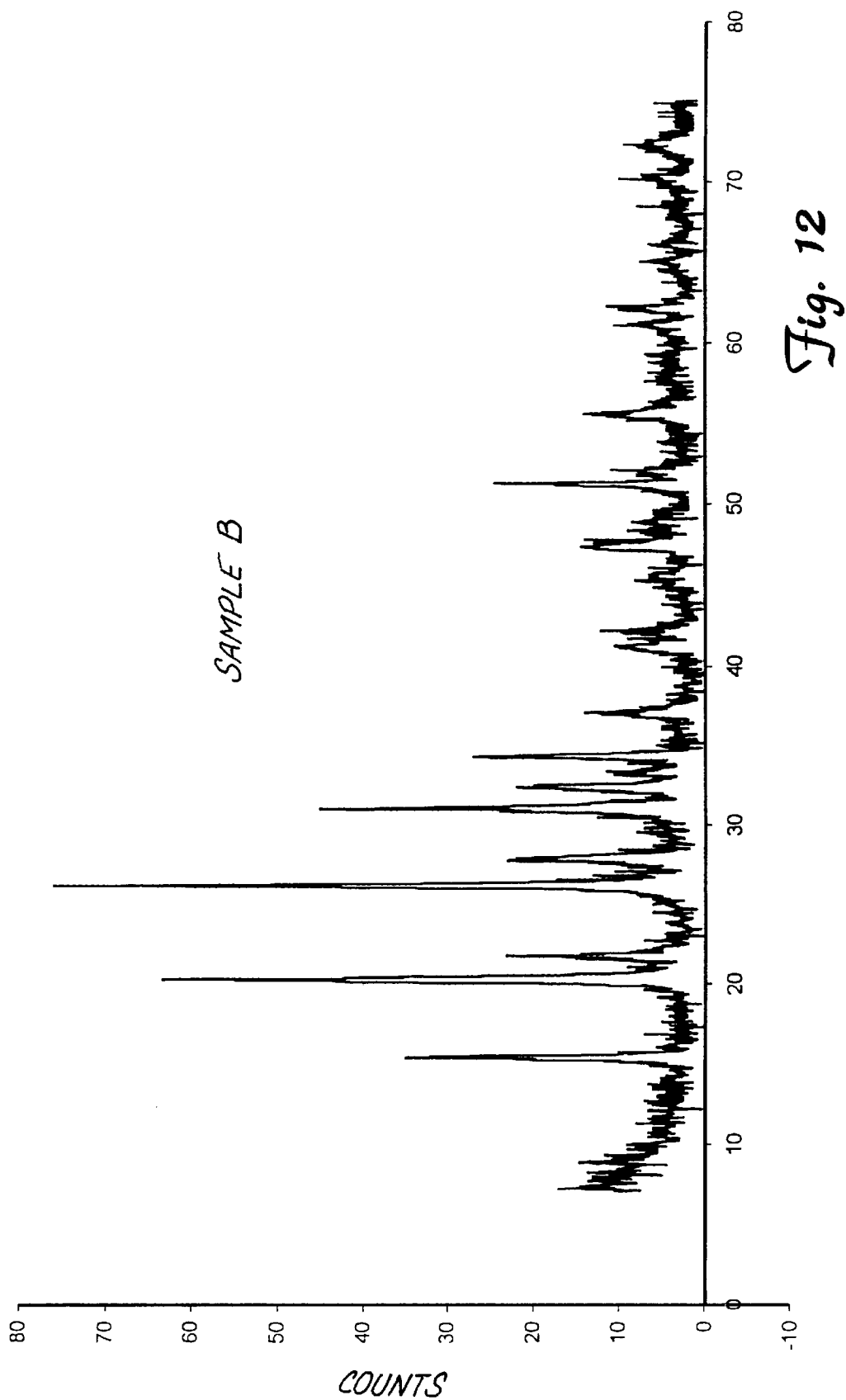

BATTERIES WITH ELECTROACTIVE NANOPARTICLES

FIELD OF THE INVENTION

This invention relates to batteries, especially lithium batteries and lithium ion batteries, incorporating nanoparticles, such as vanadium oxide nanoparticles, as an electroactive material.

BACKGROUND OF THE INVENTION

The microminiaturization of electronic components has created widespread growth in the use of portable electronic devices such as cellular phones, pagers, video cameras, facsimile machines, portable stereophonic equipment, personal organizers and personal computers. The growing use of portable electronic equipment has created ever increasing demand for improved power sources for these devices. Relevant batteries include primary batteries, i.e., batteries designed for use through a single charging cycle, and secondary batteries, i.e., batteries designed to be rechargeable. Some batteries designed essentially as primary batteries may be rechargeable to some extent.

Batteries based on lithium have been the subject of considerable development effort and are being sold commercially. Lithium based batteries generally use electrolytes containing lithium ions. The anodes for these batteries can include lithium metal (lithium batteries), or compositions that intercalate lithium (lithium ion batteries). Preferred electroactive materials for incorporation into the cathodes are compositions that intercalate lithium. The compositions that intercalate lithium, for use in the cathodes, generally are chalcogenides such as metal oxides that can incorporate the lithium ions into their lattice. Vanadium oxides are examples of promising compounds for the production of cathodes because of their high theoretical energy densities.

SUMMARY OF THE INVENTION

In a first aspect, this invention features a cathode composition including vanadium oxide particles having an average diameter less than about 1000 nm and a binder. The vanadium oxide particles preferably have an average diameter from about 5 nm to about 150 nm and more preferably from about 5 nm to about 50 nm. The binder can be polyvinylidene fluoride, polyethylene oxide, polyethylene, polypropylene, polytetrafluoroethylene, polyacrylates, mixtures thereof or copolymers thereof. The cathode composition can further include supplementary electrically conductive particles. The supplementary electrically conductive particles can include carbon. The cathode composition preferably includes from about 60 percent by weight to about 98 percent by weight vanadium oxide particles.

In another aspect, the invention features a battery including an anode, a cathode comprising vanadium oxide particles having an average diameter less than about 1000 nm and a binder, and a separator element disposed between the anode and cathode. The anode can include lithium metal or a composition that intercalates lithium. Suitable intercalation compounds for the anode include, for example, carbon compounds. The vanadium oxide particles preferably have an average diameter from about 150 nm to about 5 nm. The separator element can include a polymer electrolyte or a porous polymeric material.

In another aspect, the invention features a battery including an anode, an electrolyte, a cathode and a separator element disposed between the anode and the cathode, the electrolyte comprising lithium ions and the cathode comprising nanoparticles of intercalation type, electroactive material and a binder, wherein the electroactive material in the cathode performs with an energy density greater than about 900 Wh/kg during discharge of the battery. The battery can be a secondary battery. The electroactive material of the cathode can have an energy density from about 950 Wh/kg to about 1200 Wh/kg. The electroactive material can include vanadium oxide. The electroactive material in the anode can include a lithium intercalation composition.

Batteries based on nanoparticles such as vanadium oxide nanoparticles lead to lithium batteries and lithium ion batteries with improved performance characteristics. In particular, the vanadium oxide nanoparticles have increased energy densities compared with larger diameter vanadium oxide particles. Using electroactive materials with increased energy densities yields batteries with higher capacities for a given amount of electroactive material. In this way, longer lasting, lighter and/or smaller batteries can be produced.

Other features and advantages of the invention follow from the detailed description below.

BRIEF DESCRIPTION OF THE DRAWINGS

FIG. 12 is an x-ray diffractogram of crystalline $V_2O_5$, sample B.

DESCRIPTION OF THE PREFERRED EMBODIMENTS

Figure 1:
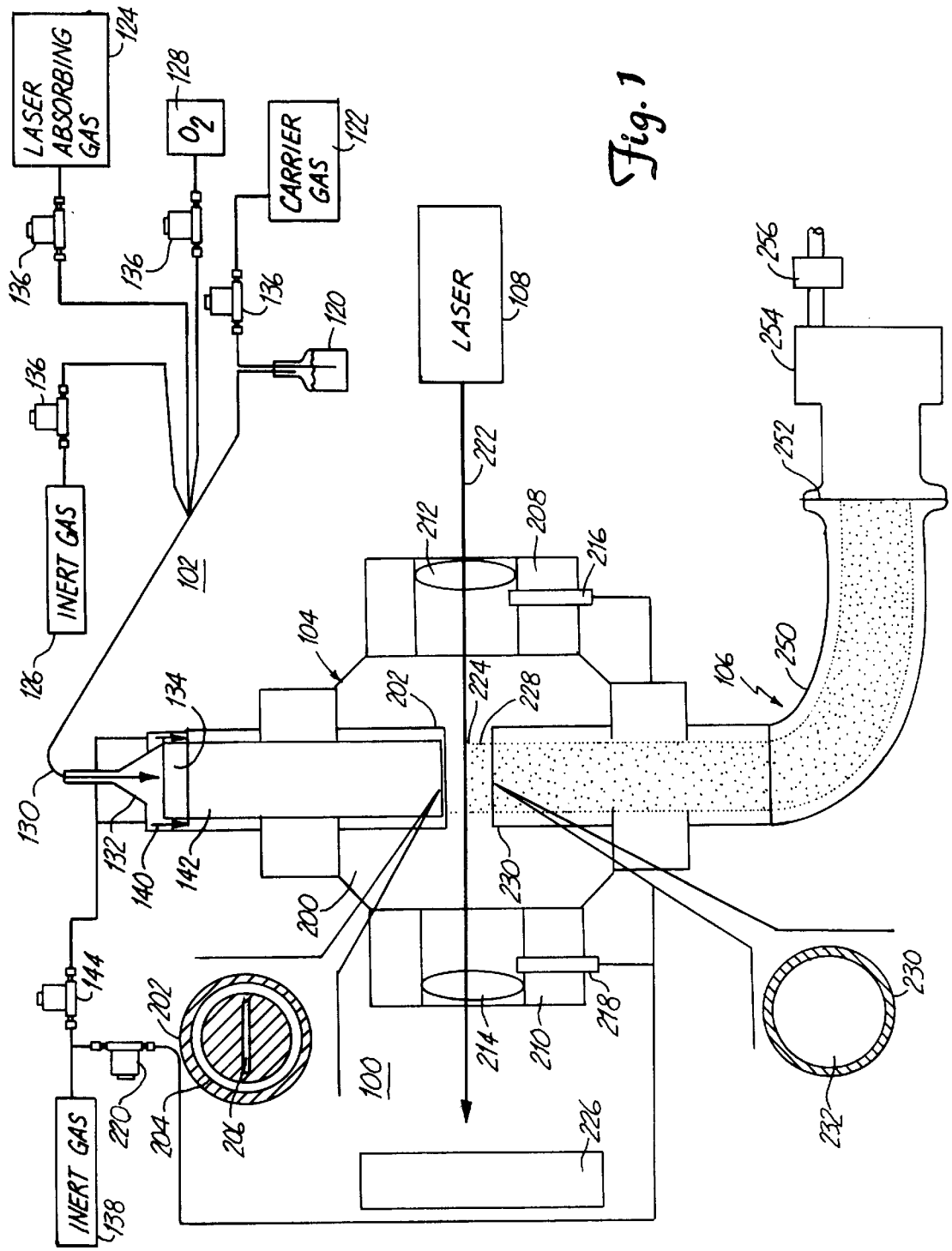
FIG. 1 is a schematic sectional view of an embodiment of a laser pyrolysis apparatus taken through the middle of the laser radiation path. The upper insert is a bottom view of the injection nozzle, and the lower insert is a top view of the collection nozzle.

Vanadium oxide particles have been produced having diameters less than a micron with vanadium in a variety of oxidation states and with a variety of lattice structures. The small size of the particles results in a significantly increased surface area for a given weight of material. Appropriate vanadium oxide nanoparticles incorporated into a cathode for a lithium based battery exhibit a significantly increased energy density relative to comparable materials of larger particle size.

The vanadium oxide nanoparticles not only have high surface area resulting from their small size, but they also can have a high degree of crystallinity. This high degree of crystallinity generally is maintained throughout each nanoparticle. Nanocrystalline materials generally do not rely on pores to generate a high surface area. Pores can be undesirable since they represent a discontinuity in the crystalline lattice. The surface area of the nanoparticles generally results only from the faces of the particle.

Amorphous nanoparticles can also be produced. Amorphous vanadium oxides can have very high energy densities. Amorphous bulk particles can undergo crystalline rearrangements that reduce the energy density during the cycling of secondary batteries.

The vanadium oxide nanoparticles can be incorporated into a cathode film with a polymeric binder. The resulting film is appropriate for use as a cathode. While some of the vanadium oxides are reasonable electrical conductors, the film preferably incorporates additional electrically conductive particles held by the binder along with the vanadium oxide particles. The cathode film can be used in a lithium battery or a lithium ion battery.

A. Production of Vanadium Oxide Nanoparticles

Laser pyrolysis has been found to be a powerful technique for producing vanadium oxides nanoparticles. In addition, the nanoscale vanadium oxide particles produced by laser pyrolysis can be subjected to additional processing to alter the properties of the nanoparticles without destroying the nanoparticle size.

A basic feature of successful application of laser pyrolysis for the production of vanadium oxide nanoparticles is the production of a molecular stream containing a vanadium precursor, a radiation absorber and an oxygen source. The molecular stream is pyrolyzed by an intense laser beam. The intense heat resulting from the absorption of the laser radiation induces the oxidation of the vanadium precursor in the oxidizing environment. As the molecular stream leaves the laser beam, rapid quenching of the vanadium materials results in particle formation.

The reaction conditions determine the qualities of the vanadium oxide particles produced by laser pyrolysis. The appropriate reaction conditions to produce a certain type of nanoparticles generally depend on the design of the particular apparatus. The reaction conditions for laser pyrolysis can be controlled relatively precisely in order to produce vanadium oxides with desired properties.

Appropriate precursor compounds generally include vanadium compounds with sufficient vapor pressure to yield desired amounts of precursor vapor. Suitable vanadium precursor compounds include, for example, $VCl_3$, $VCl_4$, $VCCl$, $V(CO)_6$ and $VOCl_3$. The Cl in these representative precursor compounds can be replaced with other halogens, e.g., Br, I and F. Preferred oxygen sources include, for example, $O_2$, CO, $CO_2$, $O_3$ and mixtures thereof.

Preferred lasers include, for example, $CO_2$ lasers, which produce infrared radiation. Infrared absorbers for inclusion in the molecular stream include, for example, $C_2H_4$, $NH_3$, $SF_6$ and $O_3$. $O_3$ can act as both an infrared absorber and as an oxygen source. The radiation absorber, such as the infrared absorber, absorbs energy from the radiation beam and distributes the energy as heat to the other reactants to drive the pyrolysis.

An inert shielding gas can be used to reduce the amount of reactant and product molecules contacting the reactant chamber components. For the production of vanadium oxide nanoparticles, appropriate shielding gases include, for example, Ar, He and $N_2$.

Referring to FIG. 1, a pyrolysis apparatus 100 involves a reactant supply system 102, reaction chamber 104, collection system 106 and laser 108. Reactant supply system 102 includes a source 120 of vanadium precursor. For liquid precursors, a carrier gas from carrier gas source 122 can be introduced into precursor source 120, containing liquid precursor to facilitate delivery of the precursor. The carrier gas from source 122 preferably is either an infrared absorber or an inert gas. The carrier gas preferably is bubbled through the liquid vanadium precursor. The quantity of precursor vapor in the reaction zone is roughly proportional to the flow rate of the carrier gas.

Alternatively, carrier gas can be supplied directly from an infrared absorber source 124 or an inert gas source 126, as appropriate. The oxidizing agent is supplied from source 128, which can be a gas cylinder. The gases from the vanadium precursor source 120 are mixed with gases from oxidizing agent source 128, infrared absorber source 124 and inert gas source 126 by combining the gases in a single portion of tubing 130. The gases are combined a sufficient distance from the reaction chamber 104 such that the gases become well mixed prior to their entrance into the reaction chamber 104. The combined gas in tube 130 passes through a duct 132 into rectangular channel 134, which forms part of an injection nozzle for directing reactants into the reaction chamber.

Flow from sources 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, Model 825 series, from Edwards High Vacuum International, Wilmington, Mass.

Inert gas source 138 is also connected to a inert gas duct 140, which flows into annular channel 142. A mass flow controller 144 regulates the flow of inert gas into inert gas duct 140. Inert gas source 126 can also function as inert gas source for duct 140, if desired.

The reaction chamber 104 includes a main chamber 200. Reactant supply system 102 connects to the main chamber 200 at injection nozzle 202. The end of injection nozzle 202 has an annular opening 204 for the passage of inert shielding gas and a rectangular slit 206 for the passage of reactant gases to form a molecular stream in the reaction chamber. Annular opening 204 has an diameter of about 1.5 inches and a width along the radial direction of about $\frac{1}{16}$ in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably plano-focusing lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 124 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J. or a Coherent® model 525 (Coherent Inc., Santa Clara, Calif.) with a maximum power output of 375 watts.

Reactants passing through slit 206 in injection nozzle 202 initiate a molecular stream. The molecular stream passes through reaction zone 224, where reaction involving the vanadium precursor takes place. Heating of the gases in reaction zone 224 is extremely rapid, roughly on the order of $10^{5°}$ C./sec depending on the specific conditions. The reaction is rapidly quenched upon leaving reaction zone 224, and nanoparticles 228 are formed in the molecular stream. The nonequilibrium nature of the process allows for the production of nanoparticles with a highly uniform size distribution and structural homogeneity.

The path of the molecular stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The preferred chamber pressure for the production of vanadium oxides ranges from about 80 Torr to about 300 Torr.

Reaction chamber 104 has two additional tubular sections not shown. One of the additional tubular sections projects into the plane of the sectional view in FIG. 1, and the second additional tubular section projects out of the plane of the sectional view in FIG. 1. These tubular sections have windows for observing the inside of the chamber. In this configuration of the apparatus, the two additional tubular sections are not used to facilitate production of nanoparticles.

Collection system 106 can include a curved channel 250 leading from collection nozzle 230. Because of the buoyant nature of the nanoparticles, the product nanoparticles follow the flow of the gas around curves. Collection system 106 includes a filter 252 within the gas flow to collect the product nanoparticles. A variety of materials such as teflon, glass fibers and the like can be used for the filter as long as the material is inert and has a fine enough mesh to trap the particles. Preferred materials for the filter include, for example, a glass fiber filter from ACE Glass Inc., Vineland, N.J.

Pump 254 is used to maintain collection system 106 at a reduced pressure. A variety of different pumps can be used. Appropriate pumps 254 include, for example, Busch Model B0024 pump from Busch, Inc., Virginia Beach, Va. with a pumping capacity of about 25 cubic feet per minute (cfm). It may be desirable to flow the exhaust of the pump through a scrubber 256 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 254 and filter 252. As the chamber pressure increases due to the accumulation of particles on filter 252, the manual valve or the throttle valve can be adjusted to maintain the pumping rate and the corresponding chamber pressure.

The reaction can be continued until sufficient nanoparticles are collected on the filter 252 such that the pump can no longer maintain the desired pressure in the reaction chamber 104 against the resistance through filter 252. When the pressure in the reaction chamber 104 can no longer be maintained at the desired value, the reaction is stopped, and the filter 252 is removed. With this embodiment, about 3–5 grams of nanoparticles can be collected in a single run. Therefore, it is straightforward to produce a macroscopic quantity of nanoparticles, i.e., a quantity visible with the naked eye.

The configuration of the reactant supply system 102 and the collection system 106 can be reversed. In this alternative configuration, the reactants can be supplied from the bottom of the reaction chamber while the products are collected from the top of the chamber. In this configuration, it is especially preferred to include a curved section in the collection system so that the collection filter is not mounted directly above the reaction chamber.

An alternative design of a laser pyrolysis apparatus has been described. See, commonly assigned U.S. patent application Ser. No. 08/808,850, entitled "Efficient Production of Particles by Chemical Reaction," incorporated herein by reference. This alternative design is intended to facilitate production of commercial quantities of nanoparticles.

As noted above, properties of the vanadium oxide nanoparticles can be modified by further processing. For example, the vanadium oxide nanoparticles can be heated in an oven in an oxidizing environment or an inert environment to alter the oxygen content and/or crystal structure of the vanadium. It has been discovered that the use of mild conditions, i.e., temperatures well below the melting point of the nanoparticles, results in modification of the stoichiometry or crystal structure of vanadium oxides without significantly sintering of the nanoparticles into larger particles. This processing is further discussed in commonly assigned and simultaneously filed, U.S. patent application Ser. No. 08/897,903, entitled "Processing of Vanadium Oxide Particles With Heat," incorporated herein by reference. The heat processing can be performed on initial particles that were not produced by laser pyrolysis, including particles that do not have a generally spherical shape, i.e., particles that are flat sheets or needle like.

Figure 2:
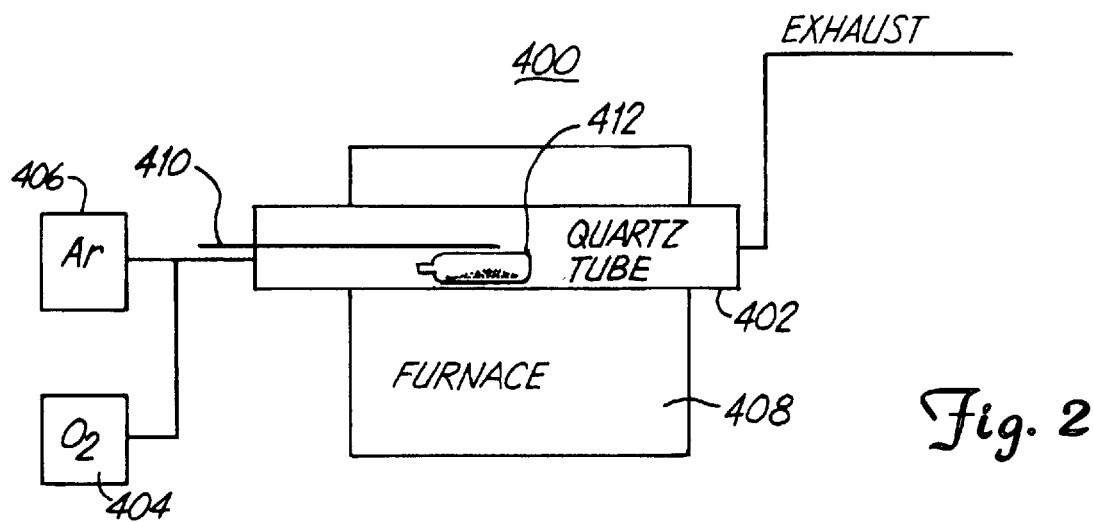
FIG. 2 is a schematic, sectional view of an oven taken through the center of the quartz tube.

An example of an apparatus 400 to perform this processing is displayed in FIG. 2. Apparatus 400 includes a tube 402 into which the nanoparticles are placed. Tube 402 is connected to an oxidizing gas source 404 and inert gas source 406. Oxidizing gas, inert gas or a combination thereof to produce the desired atmosphere are placed within tube 402.

Preferably, the desired gases are flowed through tube 402. Appropriate active gases to produce an oxidizing environment (oxidizing gas) include, for example, $O_2$, $O_3$, CO, $CO_2$ and combinations thereof. The oxidizing gases can be diluted with inert gases such as Ar, He and $N_2$. The gases in tube 402 can be exclusively inert gases, if desired.

Tube 402 is located within the heating oven or furnace 408. Oven 408 maintains the relevant portions of tube 402 at a relatively constant temperature, although the temperature can be varied systematically through the processing step, if desired. Temperature in oven 408 generally is measured with a thermocouple 410. The vanadium oxide particles can be placed in tube 402 within a vial 412. Vial 412 prevents loss of the particles due to gas flow. Vial 412 generally is oriented with the open end directed toward the direction of the source of gas flow.

The precise conditions including the type of oxidizing gas (if any), concentration of oxidizing gas, pressure or flow rate of gas, temperature and processing time can be selected to produce the desired type of product material. The temperatures generally are mild, i.e., significantly below the melting point of the material. The use of mild conditions avoids interparticle sintering resulting in larger particle sizes. Some controlled sintering of the vanadium oxide particles can be performed in oven 408 at somewhat higher temperatures to produce slightly larger average particle diameters.

For the processing of vanadium oxides, the temperatures preferably range from about 50° C. to about 1000° C., and more preferably from about 80° C. to about 800° C. The nanoparticles preferably are heated for about 1 hour to about 100 hours. High melting point $VO_2$ is relatively easy to form in the laser pyrolysis apparatuses described above. $VO_2$ is a suitable starting product for oxidation to other forms of vanadium oxide. Some empirical adjustment may be required to produce the conditions to generate the desired material.

B. Properties of the Vanadium Oxide Nanoparticles

Vanadium oxide has a intricate phase diagram due to the many possible oxidation states of vanadium. Vanadium is known to exist in oxidation states between $V^{+5}$ and $V^{+2}$. The energy differences between the oxides with vanadium in the different oxidation states is not large. Therefore, it is possible to produce stoichiometric mixed valence compounds. Known forms of vanadium oxide include VO, $VO_{1.27}$, $V_2O_3$, $V_3O_5$, $VO_2$, $V_6O_{13}$, $V_4O_9$, $V_3O_7$, and $V_2O_5$. Single phase vanadium oxide nanoparticles can be crystalline or amorphous.

There are also mixed phase regions of the vanadium oxide phase diagram. In the mixed phase regions, particles can be formed that have domains with different oxidation states or different particles can be simultaneously formed with vanadium in different oxidation states. In other words, certain particles or portions of particles have one stoichiometry while other particles or portions of particles have a different stoichiometry. Non-stoichiometric materials can also be formed.

The vanadium oxides generally form crystals with octahedral or distorted octahedral coordination. Specifically, VO, $V_2O_3$, $VO_2$, $V_6O_{13}$ and $V_3O_7$ can form crystals with octahedral coordination. In addition, $V_3O_7$ can form crystals with trigonal bipyramidal coordination. $V_2O_5$ forms crystals with square pyramidal or distorted octahedral coordination. $V_2O_5$ recently has also been produced in a two dimensional crystal structure. See, M. Hibino, et al., Solid State Ionics 79:239–244 (1995), incorporated herein by reference. When produced under appropriate conditions, the vanadium oxide nanoparticles can be amorphous. The crystalline lattice of the vanadium oxide can be evaluated using x-ray diffraction measurements.

Vanadium oxide nanoparticles produced by laser pyrolysis possibly combined with further heat processing preferably have an average diameter of less than a micron, more preferably from about 5 nm to about 150 nm and even more preferably from about 5 nm to about 50 nm. The nanoparticles generally have a roughly spherical gross appearance. Upon closer examination, the particles generally have facets corresponding to the underlying crystal lattice. Nevertheless, the nanoparticles tend to exhibit growth that is roughly equal in the three physical dimensions to give a gross spherical appearance. Diameter measurements on particles with asymmetries are based on an average of length measurements along the principle axes of the crystal. The measurements along the principle axes preferably are each less than about 1 micron for at least about 95 percent of the nanoparticles, and more preferably for at least about 98 percent of the nanoparticles.

Because of their small size, the nanoparticles tend to form loose agglomerates due to van der Waals forces between nearby particles. Nevertheless, the nanometer scale of the particles is clearly observable in transmission electron micrographs of the particles. The particles generally have a surface area corresponding to particles on a nanometer scale as observed in the micrographs. Furthermore, as described below, the nanoparticles manifest unique properties due to their small size and large surface area per weight of material.

The nanoparticles preferably have a high degree of uniformity in size. As determined from examination of transmission electron micrographs, the particles generally have a distribution in sizes such that at least about 95 percent of the particles have a diameter greater than about 40 percent of the average diameter and less than about 160 percent of the average diameter. Preferably, the nanoparticles have a distribution of diameters such that at least about 95 percent of the particles have a diameter greater than about 60 percent of the average diameter and less than about 140 percent of the average diameter. In addition, the nanoparticles generally have a high level of purity. The vanadium oxide nanoparticles are expected to have a purity greater than the reactant gases because the crystal formation process tends to exclude contaminants from the lattice.

The above described techniques have been successfully applied to the production of nanoparticles of vanadium oxide with several different stoichiometries and with different crystal structures with the same stoichiometry. The structures and compositions have been examined using x-ray defractometry. The sizes of some of the particles have been examined using transmission electron microscopy. The properties of the types of vanadium oxide nanoparticles obtained are summarized in Table 1.

TABLE 1

| Stoichiometry | Lattice |
| --- | --- |
| Single Phase $VO_2$ | Monoclinic |
| Single Phase $VO_{1.27}$ | Tetragonal |
| Single Phase $V_2O_5$ | Amorphous |
|  | 2-D crystals |
|  | Crystalline |
| Mixed Phase $V_6O_{13}$ + $VO_2$ | $V_6O_{13}$ majority/Monoclinic |
| Mixed Phase $V_2O_3$ + $VO_2$ | $V_2O_3$ majority/Rhombohedral |

Additional information on the production and properties of vanadium oxide nanoparticles is found in commonly assigned and simultaneously filed, U.S. patent application Ser. No. 08/897,778, entitled "Vanadium Oxide Nanoparticles," incorporated herein by reference.

C. Lithium Based Batteries

Figure 3:
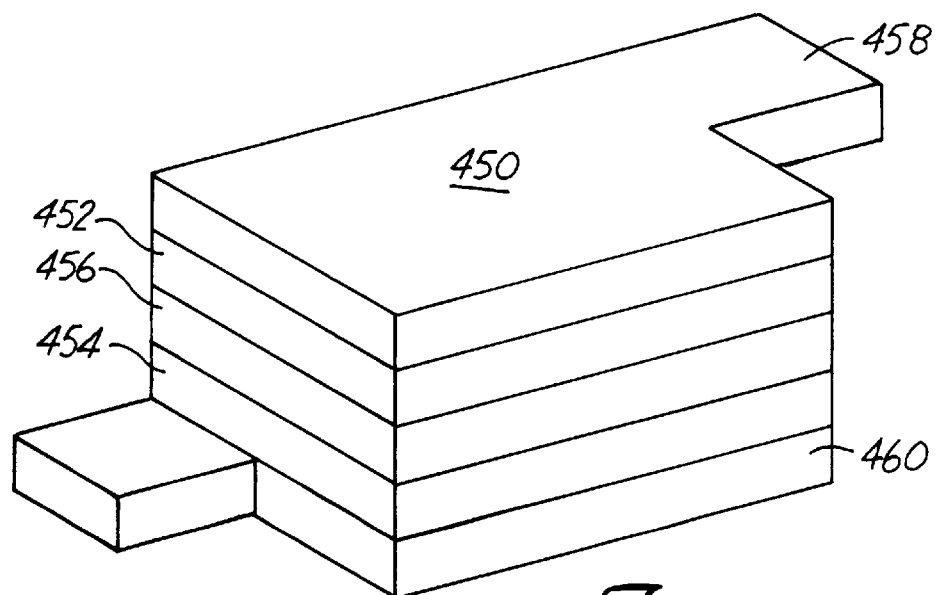
FIG. 3 is a schematic, perspective view of a battery of the invention.

Referring to FIG. 3, battery 450 has an anode 452, a cathode 454 and separator 456 between anode 452 and cathode 454. A single battery can include multiple cathodes and/or anodes. Electrolyte can be supplied in a variety of ways as described further below. Battery 450 preferably includes current collectors 458, 460 associated with anode 452 and cathode 454, respectively. Multiple current collectors can be associated with each electrode if desired.

Lithium has been used in reduction/oxidation reactions in batteries because they are the lightest metal and because they are the most electropositive metal. Certain forms of vanadium oxide are known to incorporate lithium ions into its structure through intercalation or similar mechanisms such as topochemical absorption. Intercalation of lithium ions into suitable forms of a vanadium oxide lattice forms $Li_xVO_y$. Appropriate vanadium oxides can be an effective electroactive material for a cathode in either a lithium or lithium ion battery.

Lithium intercalated vanadium oxide is formed in the battery during discharge. The lithium leaves the lattice upon recharging, i.e., when a voltage is applied to the cell such that electric current flows into the cathode due to the application of an external EMF to the battery. Intercalation generally is reversible, making certain vanadium oxides suitable for the production of secondary batteries.

Cathode 454 includes electroactive nanoparticles such as vanadium oxide nanoparticles held together with a binder. Nanoparticles for use in cathode 454 generally can have any shape, e.g., roughly spherical nanoparticles or elongated nanoparticles. Cathode 454 can include other electroactive nanoparticles such as $TiO_2$ nanoparticles. The production of $TiO_2$ nanoparticles has been described, see U.S. patent Ser. No. 4,705,762, incorporated herein by reference. $TiO_2$ nanoparticles are expected to exhibit relatively high energy densities in lithium based batteries by analogy with the results discovered for vanadium oxides nanoparticles.

The cathode optionally can include electrically conductive particles in addition to the electroactive nanoparticles. These supplementary, electrically conductive particles generally are also held by the binder. Suitable electrically conductive particles include conductive carbon particles such as carbon black, metal particles such as silver particles and the like.

With vanadium oxide nanoparticles, very high energy densities have been achieved. Preferred vanadium oxide nanoparticles have energy densities in lithium based batteries significantly greater than the theoretical maximum values for the corresponding bulk vanadium oxide particles. Vanadium oxide nanoparticles preferably have energy densities at least about 150 percent of the theoretical maximum of the bulk material, and more preferably at least about 200 percent of the theoretical maximum of the bulk material. Specifically, preferred vanadium oxide nanoparticles in lithium based batteries have an energy density of at least about 900 Wh/kg, preferably at least about 1000 Wh/kg. Electroactive nanoparticles can have an energy density in the range from 1000 Wh/kg to about 1200 Wh/kg.

High loadings of particles can be achieved in the binder. Particles preferably make up greater than about 80 percent by weight of the cathode, and more preferably greater than about 90 percent by weight. The binder can be any of various suitable polymers such as polyvinylidene fluoride, polyethylene oxide, polyethylene, polypropylene, polytetrafluoroethylene, polyacrylates and mixtures and copolymers thereof.

Anode 402 can be constructed from a variety of materials that are suitable for use with lithium ion electrolytes. In the case of lithium batteries, the anode can include lithium metal or lithium alloy metal either in the form of a foil, grid or metal particles in a binder.

Lithium ion batteries use particles of an composition that can intercalate lithium. The particles are held with a binder in the anode. Suitable intercalation compounds include, for example, graphite, synthetic graphite, coke, mesocarbons, doped carbons, fullerenes, niobium pentoxide and $SnO_2$.

Current collectors 458, 460 facilitate flow of electricity from battery 450. Current collectors 458, 460 are electrically conductive and generally made of metal such as nickel, iron, stainless steel, aluminum and copper and can be metal foil or preferably a metal grid. Current collector 458, 460 can be on the surface of their associated electrode or embedded within their associated electrode.

The separator element 456 is electrically insulating and provides for passage of at least some types of ions. Ionic transmission through the separator provides for electrical neutrality in the different sections of the cell. The separator generally prevents electroactive compounds in the cathode from contacting electroactive compounds in the anode.

A variety of materials can be used for the separator. For example, the separator can be formed from glass fibers that form a porous matrix. Preferred separators are formed from polymers such as those suitable for use as binders. Polymer separators can be porous to provide for ionic conduction. Alternatively, polymer separators can be solid electrolytes formed from polymers such as polyethylene oxide. Solid electrolytes incorporate electrolyte into the polymer matrix to provide for ionic conduction without the need for liquid solvent.

Electrolytes for lithium batteries or lithium ion batteries can include any of a variety of lithium salts. Preferred lithium salts have inert anions and are nontoxic. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride and lithium perfluorobutane.

If a liquid solvent is used to dissolve the electrolyte, the solvent preferably is inert and does not dissolve the electroactive materials. Generally appropriate solvents include, for example, propylene carbonate, dimethyl carbonate, diethyl carbonate, 2-methyl tetrahydrofuran, dioxolane, tetrahydrofuran, 1, 2-dimethoxyethane, ethylene carbonate, γ-butyrolactone, dimethyl sulfoxide, acetonitrile, formamide, dimethylformamide and nitromethane.

The shape of the battery components can be adjusted to be suitable for the desired final product, for example, a coin battery, a rectangular construction or a cylindrical battery. The battery generally includes a casing with appropriate portions in electrical contact with current collectors and/or electrodes of the battery. If a liquid electrolyte is used, the casing should prevent the leakage of the electrolyte. The casing can help to maintain the battery elements in close proximity to each other to reduce resistance within the battery. A plurality of battery cells can be placed in a single case with the cells connected either in series or in parallel.

EXAMPLES

Vanadium oxide based lithium batteries were evaluated to determine the charge capacity and energy density of the vanadium oxide powders used as active materials in the cathodes. The batteries tested in the following examples were all produced following a common procedure. The vanadium oxide powders (VO) were mixed with a conductive acetylene black powder (AB) (Catalog number 55, Chevron Corp.) at a ratio of 60:30. The powder mixture was ground with a mortar and palette to thoroughly mix the powders.

A few drops of polyvinylidene fluoride (PVDF) solution were added to the homogeneous powder mixture. The 10 percent PVDF solution included PVDF (Catalog reference R-1, Elf Atochem North America, Inc., Philadelphia, Pa.) dissolved in 1-methyl-2-pyrroidinone (Aldrich Chemical Co., Milwaukee, Wis.). The final ratio of VO:AB:PVDF was 60:30:10. The resulting slurry was spread onto a preweighed nickel metal mesh. The mesh with the slurry was baked in a vacuum oven overnight at 120° C. to remove the solvent and residual moisture. After removal from the oven, the electrodes were immediately placed in a glove box (Vacuum Atmosphere Co., Hawthorne, Calif.) under an argon atmosphere and weighted again.

Figure 4:
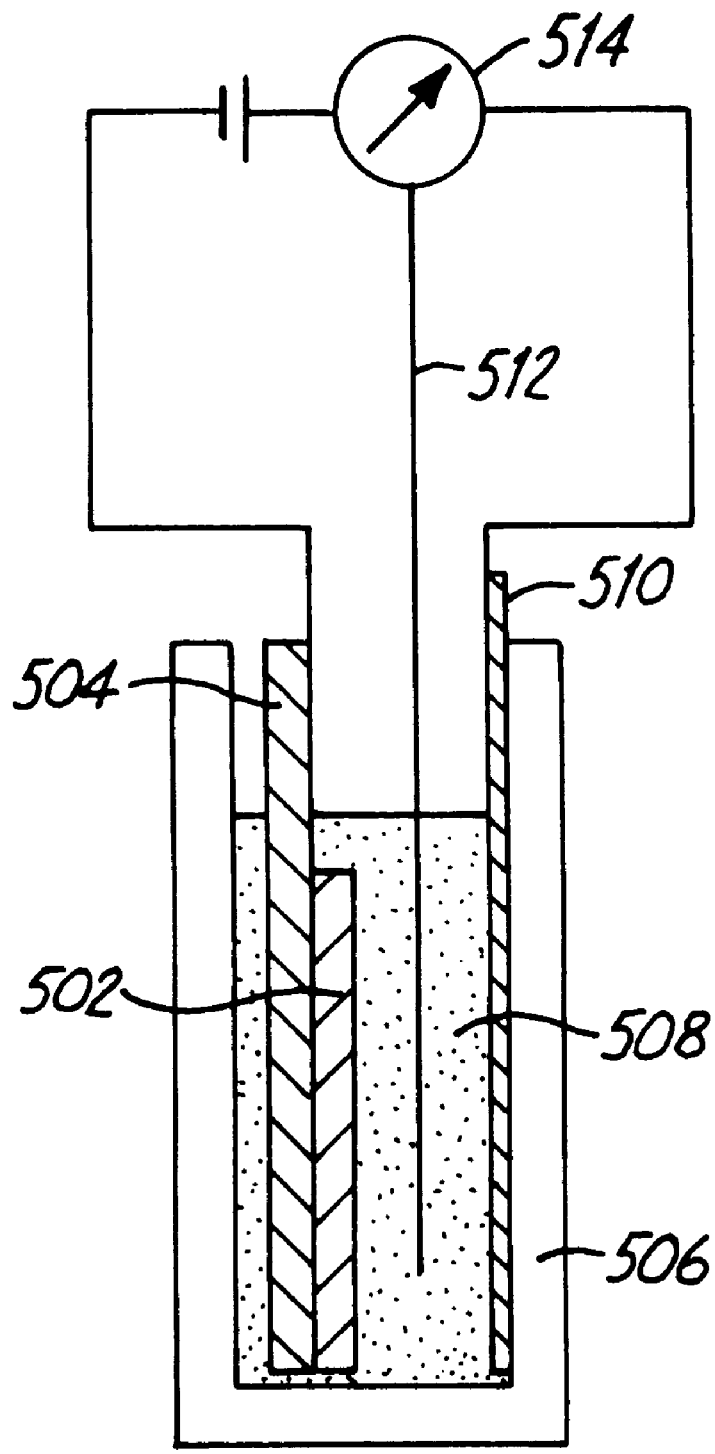
FIG. 4 is a schematic, perspective view of the three electrode arrangement used in the examples.

All discharge/charge experiments were conducted in the glove box. The water and oxygen concentrations in the glove box were measured to be less than 1 ppm and 1.5 ppm, respectively. The samples were tested in a three electrode configuration, as shown if FIG. 4. In the test set up, cathode 502 on nickel mesh 504 is place in container 506. Container 506 holds liquid electrolyte 508. Counter electrode 510 and reference electrode 512 are also placed into container 506. Lithium metal was used as both counter electrode and reference electrode. The electrodes are connected to a battery testing system 514.

No separator is needed for this testing configuration since the electrodes are physically separated. Alternatively, the liquid electrolyte can be viewed as the separator. The liquid electrolyte (from Merck & Co., Inc.) was 1M $LiClO_4$ in propylene carbonate.

The samples were tested at the same discharge/charge rate of C/20 (i.e., a rate such that the cathode would be fully discharged in 20 hours), and cycled between 4.0 volts and 1.8 volts at 25° C. The measurements were controlled by an Arbin Battery Testing System, Model BT4023, from Arbin Instruments, College Station, Tex. The charging/discharging profiles were recorded, and the discharge capacity and energy density of the active materials were obtained.

The energy density is evaluated by the integral over the discharge time of the voltage multiplied by the current divided by the mass of the active material. The current is kept approximately constant during discharge. Currents used during testing ranged from about 0.08 mA to about 0.12 mA. The current is adjusted to have an approximately constant current density for all the tests. The current density was about 0.1 $mA/cm^2$. The active material mass ranged from about 5 to about 17 mg.

Comparative Example 1- Commercial $V_6O_{13}$

Commercial $V_6O_{13}$ was purchased from Alfa Aesar, a Johnson Matthey Company, Ward Hill, Mass. A 7.8 mg quantity of the commercial $V_6O_{13}$ powder was processed into a cathode and tested in a lithium battery, as described above. Over the course of the 170 hour test, the battery was discharged three times. The initial voltage was 3.54 V. The cell had a discharge capacity of 246.2 Ah/kg and an energy density of the cathode active material of 610.1 Wh/kg. This energy density compared with a theoretical maximum value of 890 Wh/kg based on the reversible intercalation of up to 8 lithium ions per unit cell of vanadium oxide.

Example 1- $VO_2$ Nanoparticles

Nanoscale $VO_2$ particles were produced by laser pyrolysis using the apparatus shown in FIG. 1. The conditions for the synthesis are presented in Table 2.

TABLE 2

| Typical Reaction Parameter Values | | | | |
|---|---|---|---|---|
| Phase | $VO_2$ | $V_2O_5$ | $V_2O_5$ | $V_6O_{13}$ + $VO_2$ |
| Crystal Structure | Monoclinic | 2D crystal | Amorphous | Monoclinic |
| Pressure (Torr) | 320 | 300 | 135 | 110 |
| Argon - Win (sccm) | 700 | 700 | 700 | 700 |
| Argon - Sld. (slm) | 5.6 | 1.12 | 0.98 | 2.1 |
| Ethylene (sccm) | 460 | 268 | 603 | 173 |
| Carrier Gas (sccm) | Ethyl. | 676(Ar) | 116(Ar) | 140(Ar) |
| Oxygen (sccm) | 36 | 400 | 284 | 88 |
| Laser Output (watts) | 96 | 67 | 180 | 192 |
| Nozzle Opening (in) | 5/8 × 1/16 | 5/8 × 1/16 | 5/8 × 1/16 | 5/8 × 1/8 | sccm=standard cubic centimeters per minute
slm=standard liters per minute
Argon-Win.=argon flow through inlets 216, 218
Argon-Sld.=argon flow through annular channel 142

Figure 5:
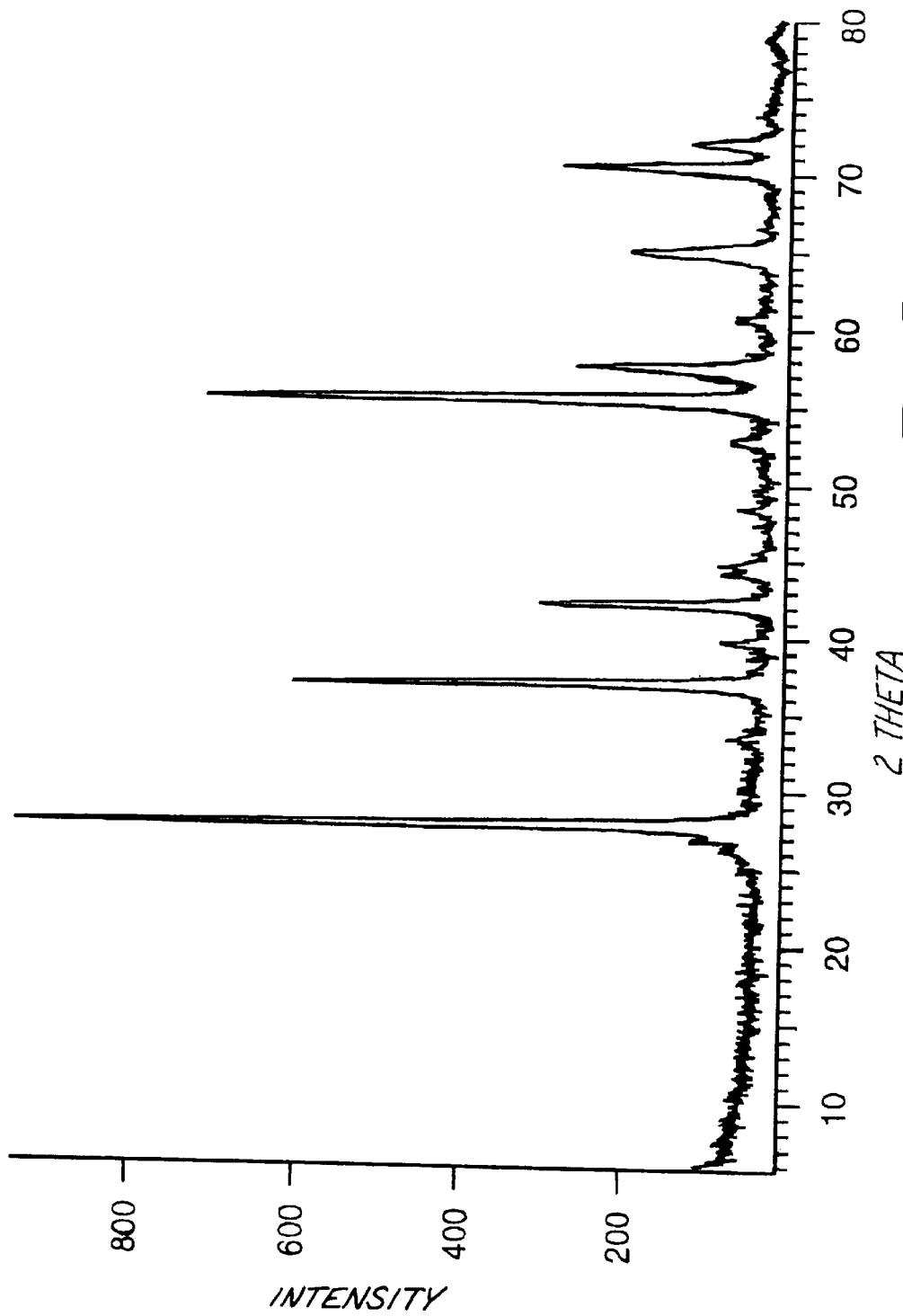
FIG. 5 is an x-ray diffractogram of $VO_2$ nanoparticles.
Figure 6:
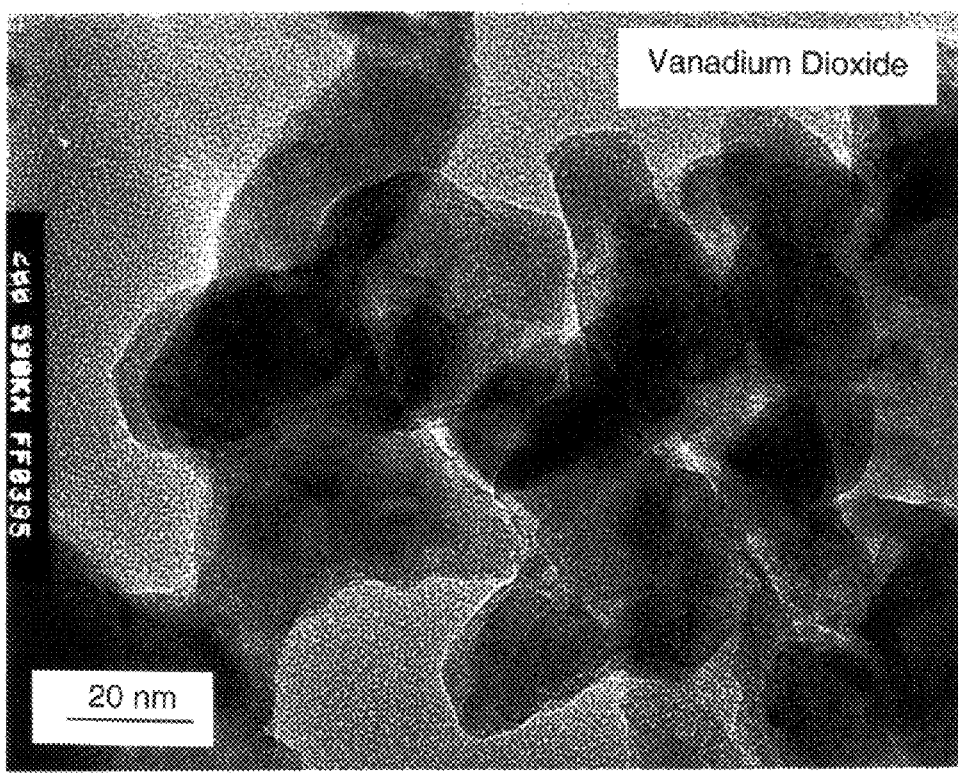
FIG. 6 is a transmission electron micrograph view of crystalline $VO_2$ nanoparticles.
Figure 7:
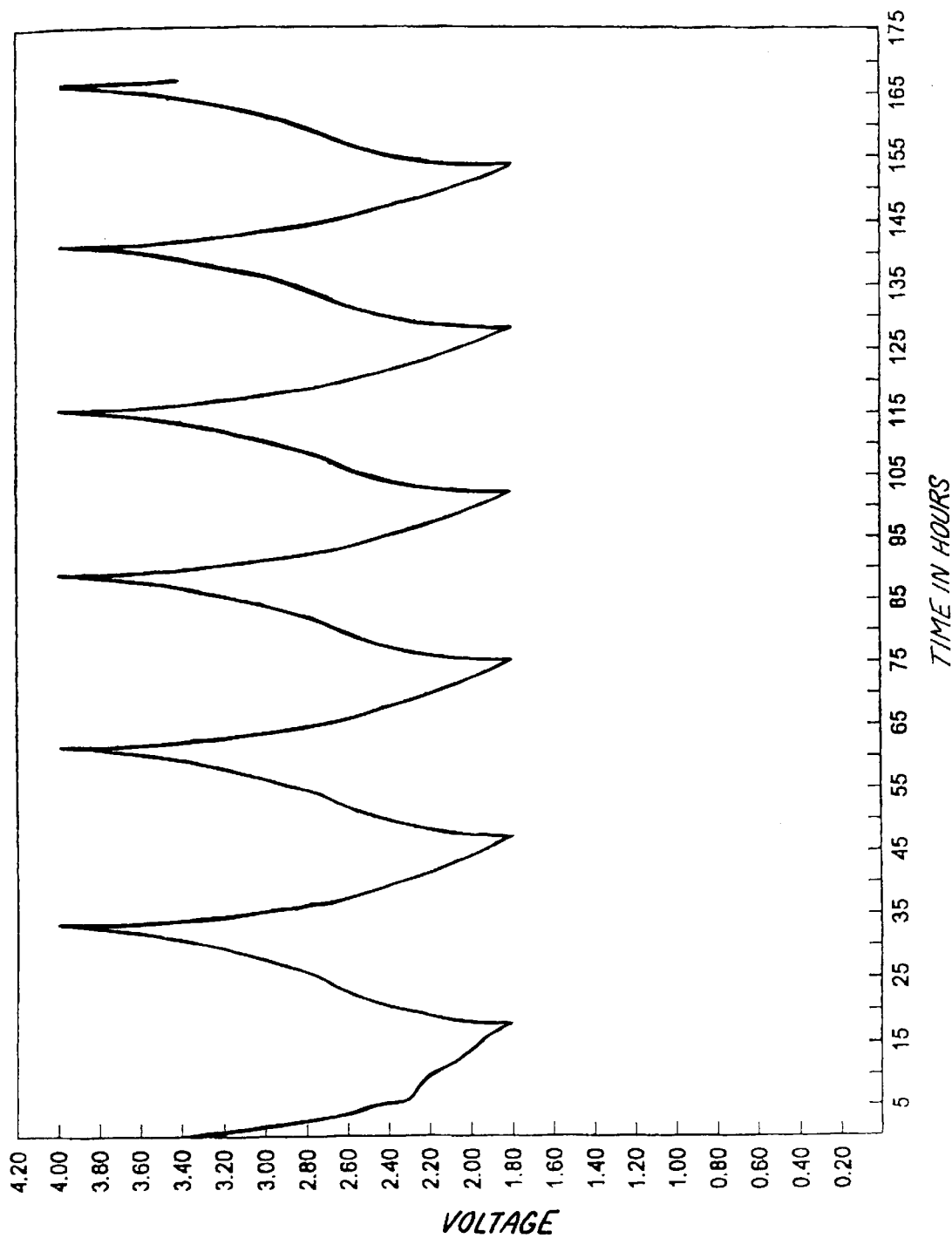
FIG. 7 depicts the discharge/recharge cycling of a battery of the invention using $VO_2$ electroactive particles.

An x-ray diffractogram of nanoscale $VO_2$ powders is presented in FIG. 5. A transmission electron microscope (TEM) photograph of the particles is shown in FIG. 6. An analysis of the TEM photo reveals an average particle size of about 22 nm. A plot of voltage as a function of time during the discharge/charge cycling is shown in FIG. 7. A battery produced with these materials yielded a Discharge Capacity of 249 Ah/kg and an energy density of 549 Wh/kg. The Discharge Capacity and Energy Density are nearly twice the values obtained from larger $VO_2$ particles. These values are higher than the theoretical maximum-stoichiometric energy density of 390 Wh/kg for $VO_2$ for the bulk material at 25° C. See, K. West et al., "Vanadium Oxides as Electrode Materials for Rechargeable Lithium Cells," J. of Power Sources 20:165–172 (1987), incorporated herein by reference.

Example 2- Singe Phase 2D-$V_2O_5$ Nanoparticles

Single phase 2-D $V_2O_5$ nanoparticles were produced by laser pyrolysis using the apparatus shown in FIG. 1. The conditions for the synthesis are presented in Table 2.

Figure 8:
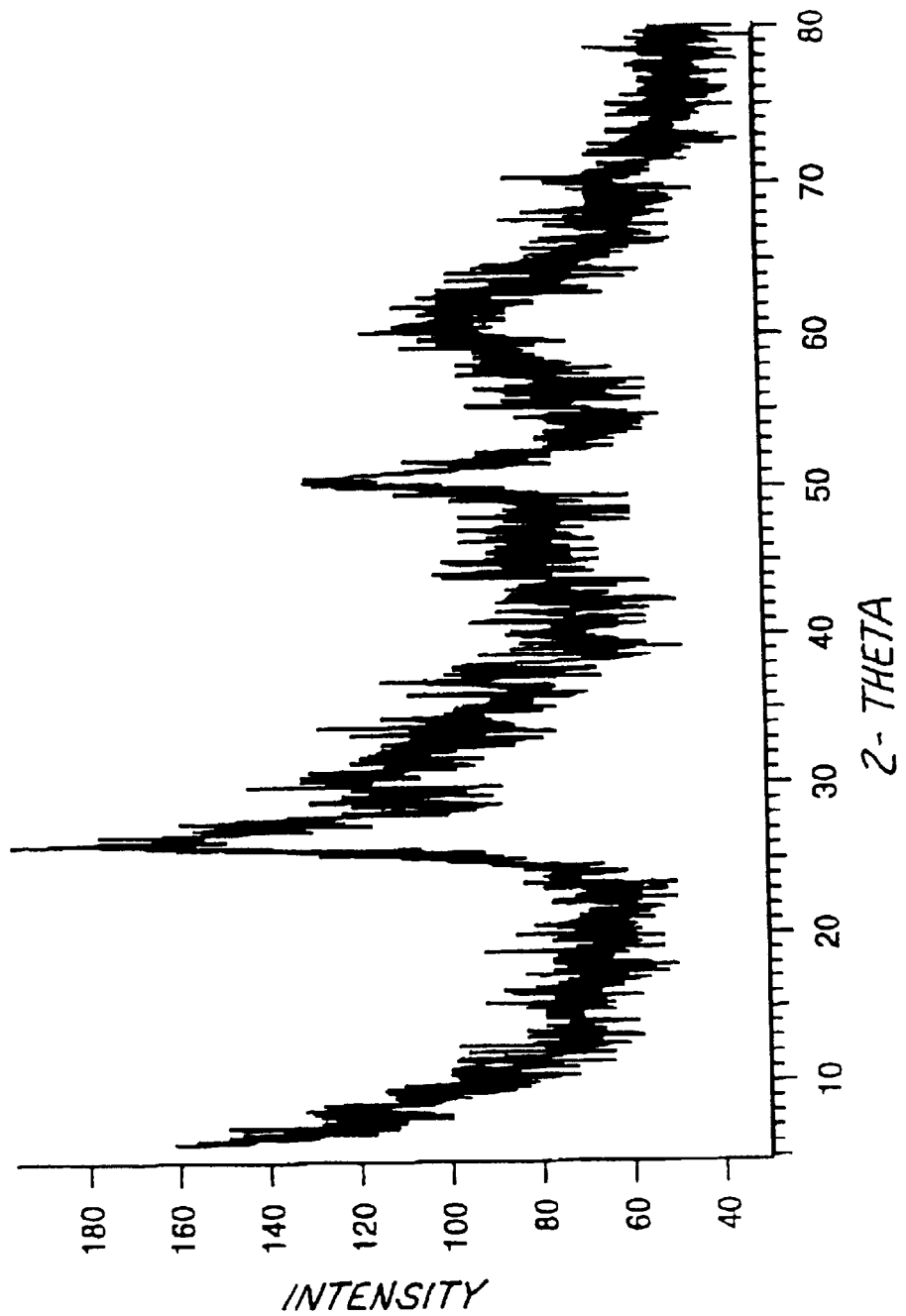
FIG. 8 is an x-ray diffractogram of 2-D crystalline $V_2O_5$.

A x-ray diffractogram of nanoscale 2-D $V_2O_5$ powders is presented in FIG. 8. An analysis of a TEM photo of the materials reveals an average particle size of about 20 nm. A battery produced with these materials yielded a Discharge Capacity of 146 Ah/kg and an Energy Density of 380 Wh/kg.

Example 3- Amorphous $V_2O_5$ Nanoparticles

Single phase amorphous $V_2O_5$ nanoparticles were produced by laser pyrolysis using the apparatus shown in FIG. 1. The conditions for the synthesis are presented in Table 2.

Figure 9:
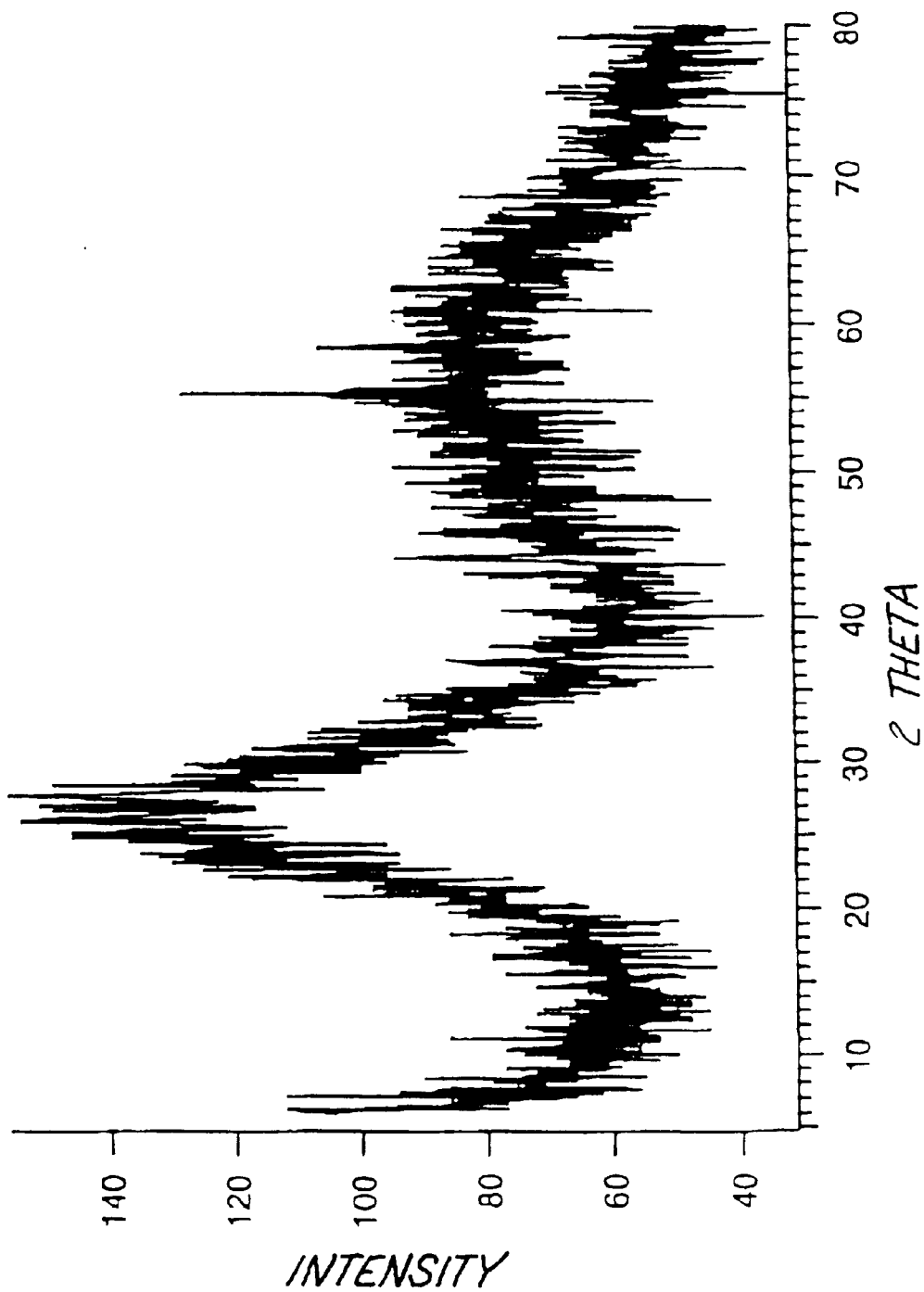
FIG. 9 is an x-ray diffractogram of amorphous $V_2O_5$.

A typical x-ray diffractogram of nanoscale amorphous $V_2O_5$ nanoparticle powders is presented in FIG. 9. An analysis of a TEM photo of the materials reveals an average particle size of about 200 nm for the amorphous $V_2O_5$ nanoparticles used to form the cathode. Two batteries produced with these materials yielded Discharge Capacities of 186.1 Ah/kg and 177.3 Ah/kg, and Energy Densities of 476 Wh/kg and 446.2 Wh/kg.

Example 4- Mixed Phase $V_6O_{13}$/$VO_2$ Nanoparticles

Mixed phase crystalline $V_6O_{13}$/$VO_2$ nanoparticles were produced by laser pyrolysis using the apparatus shown in FIG. 1. The conditions for the synthesis are presented in Table 2.

Figure 10:
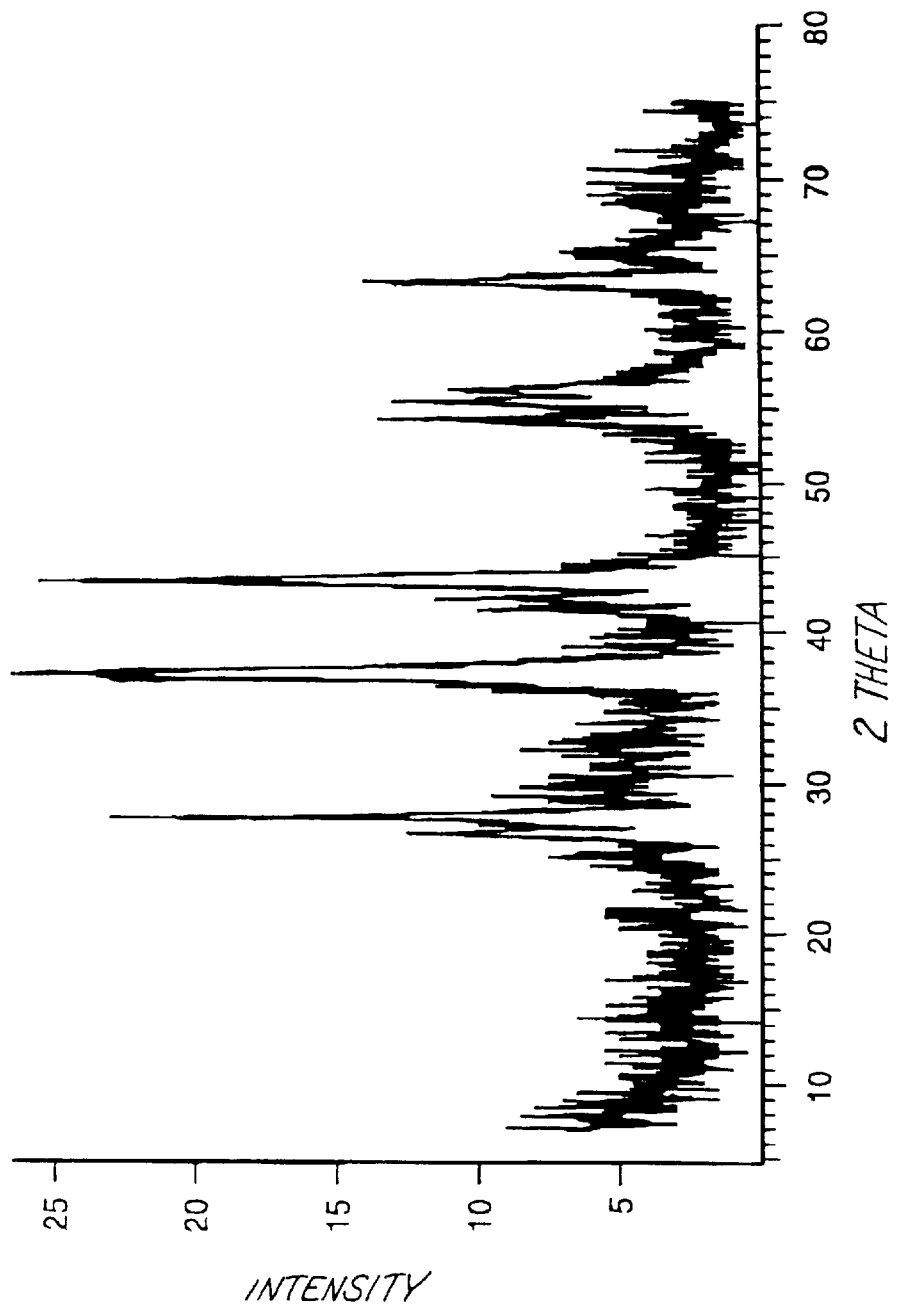
FIG. 10 is an x-ray diffractogram of mixed phase $V_6O_{13}$ + $VO_2$.

A x-ray diffractogram of the mixed phase nanoscale crystalline $V_6O_{13}/VO_2$ nanoparticle powders is presented in FIG. 10. An analysis of a TEM photo of the materials reveals an average particle size of about 20 to about 30 nm for the mixed phase $V_6O_{13}/VO_2$ nanoparticles. A battery produced with these materials yielded a Discharge Capacity of 174 Ah/kg and an Energy Density of 403 Wh/kg.

Example 5- Crystalline $V_2O_5$ Nanoparticles

The crystalline $V_2O_5$ nanoparticles were produced by further processing nanoparticles produced by laser pyrolysis in an oven with an oxygen atmosphere. Two types of nanoparticles produced by laser pyrolysis (Sample A and Sample B) were used for further processing. The nanoparticles of Sample A were amorphous $V_2O_5$ particles. The nanoparticles of samples B were crystalline $VO_2$ nanoparticles. The conditions used for the production of the two samples is shown in Table 3. A third sample was produced by laser pyrolysis using conditions presented in column 3 of Table 3.

TABLE 3

| Phase | $V_2O_5$ | $VO_2$ | |
| --- | --- | --- | --- |
| Crystal Structure | Amorphous | Monoclinic | |
| Pressure (Torr) | 142.5 | 127 | 230 |
| Arson - Win (sccm) | 700 | 700 | 700 |
| Argon - Sld. (slm) | 0.98 | 0.98 | 5.6 |
| Ethylene (sccm) | 1072 | 268 | 2680 |
| Carrier Gas (Argon) sccm | 676 | 676 | 980 |
| Oxygen (sccm) | 642 | 200 | 700 |
| Laser Output (watts) | 215 | 220 | 180 |
| Nozzle Size | 5/8 " x 1/16" | 5/8 " x 1/16" | 5/8 " x 1/8" |

Figure 11:
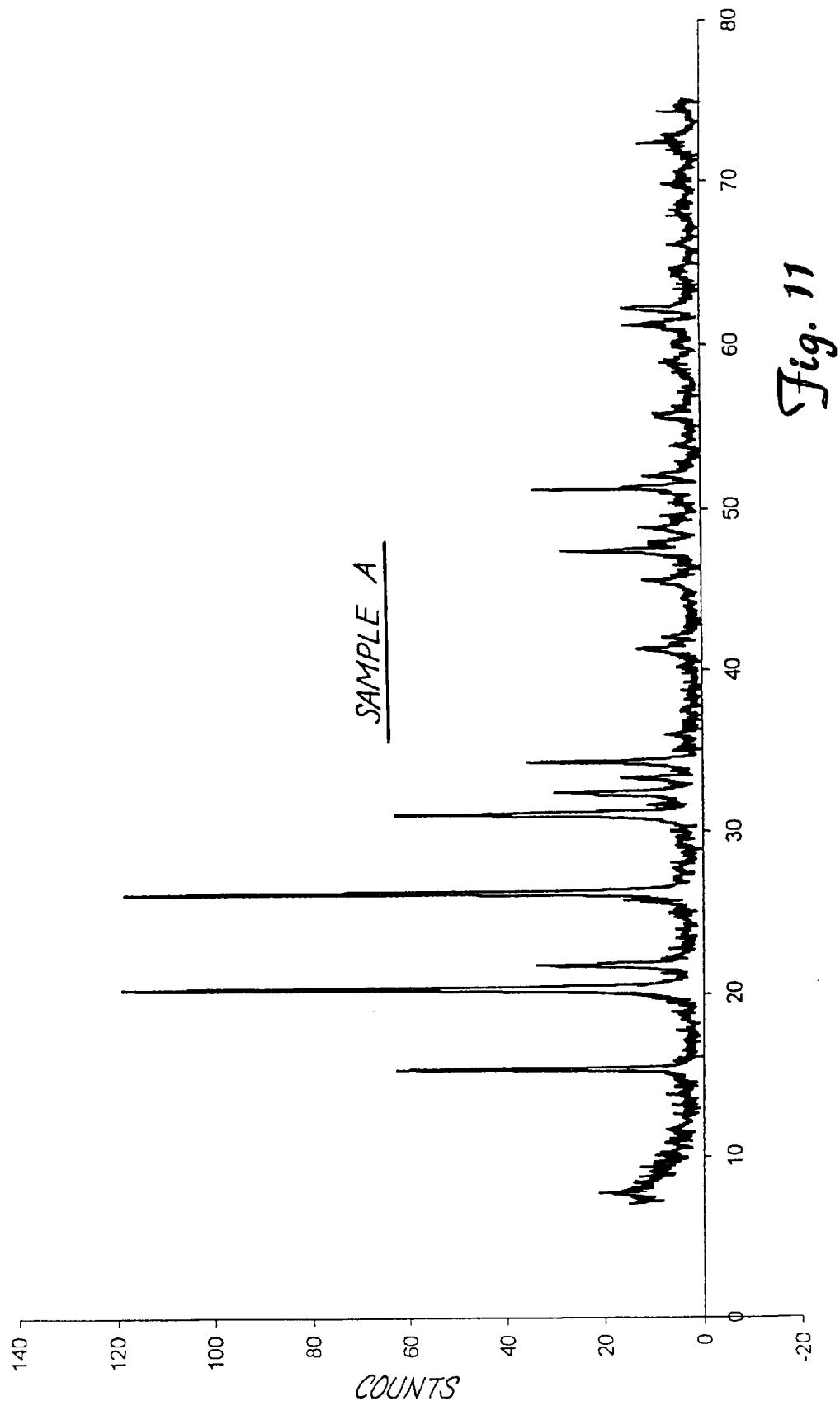
FIG. 11 is an x-ray diffractogram of crystalline $V_2O_5$, sample A.

Quantities of nanoparticles from both Sample A and Sample B were further processed in an oven, as schematically shown in FIG. 2. The nanoparticles were processed in the oven for 16 hours at 202° C. with an $O_2$ flow rate of 105.6 sccm. The resulting nanoparticles from both Sample A and Sample B were crystalline $V_2O_5$ with characteristic x-ray diffraction spectra as shown in FIGS. 11 and 12, respectively. Note that nanoparticles of both amorphous $V_2O_5$ and crystalline $VO_2$ were converted into similar vanadium oxide nanocrystals.

The crystalline $V_2O_5$ nanoparticles were formed into batteries. The crystalline $V_2O_5$ nanoparticles from Sample A yielded a Discharge Capacity of 399 Ah/kg and a Energy Density of 1005 Wh/kg while the crystalline $V_2O_5$ nanoparticles from Sample B yielded a Discharge Capacity of 370 Ah/kg and an Energy Density of 919 Wh/kg. Note that crystalline $V_2O_3$ nanoparticles have resulted in an Energy Density greater than 1000 Wh/kg, which is greater than a factor of two larger than estimated theoretical maximum values for bulk $V_2O_5$.

The third sample (column 3 of Table 3) was also further processed in an oven. The nanoparticles were heated for 16 hours at 227° C. with an $O_2$ flow rate of 105.6 sccm. Processing these heat treated particles into a battery as described above, a Discharge Capacity of 438 Ah/kg and an Energy Density of 1121 Wh/kg were measured.

Example 6- Summary of Oven Treated Nanoparticles And Nanoparticles Produced Directly by Laser Pyrolysis This example summarizes a set of measurements taken with different batches of vanadium oxide nanoparticles. The nanoparticles were either made directly with laser pyrolysis (Table 4A) or with additional heating in an oven under oxidizing conditions (Table 4B).

TABLE 4A

Vanadium Oxide Properties

| Material | Discharge Capacity (Ah/kg) | Energy Density (Wh/kg) |
| --- | --- | --- |
| Amorphous $V_2O_5$ | 182 | 461 |
| $VO_2$* | 137 | 328 |
| 2D - $V_2O_5$** | 146 | 380 |
| $VO_2$ | 235 | 519 |
| $VO_2$ | 249 | 549 |
| $VO_2$ | 168 | 377 |
| $VO_{1.27}$ | 118 | 270 |
| $V_2O_3$ | 94 | 209 |
| Mixed Phase $VO_2/V_6O_{13}$ | 228 | 510 |
| Amorphous $V_2O_5$ | 188 | 445 |
| Mixed Phase - $V_6O_{13}/VO_2$ | 174 | 403 |

TABLE 4B

Vanadium Oxide Properties - Heat Treated

| Material | Discharge Capacity (Ah/kg) | Energy Density (Wh/kg) |
| --- | --- | --- |
| Orthorhombic $V_2O_5$ | 336 | 848 |
| Mixed Phase $VO_2/V_2O_5$ | 297 | 721 |
| Orthorhombic $V_2O_5$ | 399 | 1005 |
| Orthorhombic $V_2O_5$ | 370 | 919 |
| 2-D $V_2O_5$ | 292 | 738 |
| Mixed Phase 2D $V_2O_5/VO_2$ | 304 | 751 |
| | 438 | 1121 |

The embodiments described above are intended to be representative and not limiting. Additional embodiments of the invention are within the claims. As will be understood by those skilled in the art, many changes in the methods and apparatus described above may be made by the skilled practitioner without departing from the spirit and scope of the invention, which should be limited only as set forward in the claims which follow.

What is claimed is:

1. A cathode composition comprising vanadium oxide particles having an average diameter from about 5 nm to about 150 nm and a binder.

2. The cathode composition of claim 1 wherein the vanadium oxide particles have an average diameter from about 50 nm to about 5 nm.

3. The cathode composition of claim 1 wherein the binder comprises polyvinylidene fluoride, polyethylene oxide, polyethylene, polypropylene, polytetrafluoroethylene, polyacrylates or mixtures or copolymers thereof.

4. The cathode composition of claim 1 further comprising supplementary electrically conductive particles.

5. The cathode composition of claim 5 wherein the supplementary electrically conductive particles comprise carbon.

6. The cathode composition of claim 1 wherein the cathode comprises from about 60 percent by weight to about 98 percent by weight vanadium oxide particles.

7. A battery comprising an anode, a cathode comprising vanadium oxide particles having an average diameter from about 5 nm to about 150 nm and a binder, and a separator element disposed between the anode and the cathode.

8. The battery of claim 7 wherein the anode comprises lithium metal.

9. The battery of claim 7 wherein the anode comprises a composition that intercalates lithium.

10. The battery of claim 9 wherein the intercalation compound within the anode comprises carbon.

11. The battery of claim 7 wherein the vanadium oxide particles have an average diameter from about 50 nm to about 5 nm.

12. The battery of claim 7 wherein the separator element comprises a polymer electrolyte.

13. The battery of claim 7 wherein the separator element comprises a porous polymeric material.

14. A battery comprising an anode, an electrolyte, a cathode and a separator element disposed between the anode and the cathode, the electrolyte comprising lithium ions and the cathode comprising nanoparticles of electroactive material that intercalates lithium ions and a binder, wherein the nanoparticles of electroactive material in the cathode have an average diameter from about 5 nm to about 150 nm and wherein the electroactive material in the cathode exhibits an energy density greater than about 900 Wh/kg during discharge of the battery.

15. The battery of claim 14 wherein the battery is a secondary battery.

16. The battery of claim 14 wherein the electroactive material in the cathode exhibits an energy density from about 950 Wh/kg to about 1200 Wh/kg.

17. The battery of claim 14 wherein the electroactive nanoparticles comprise vanadium oxide.

18. The battery of claim 14 wherein the electroactive material in the anode comprises a composition that intercalates lithium.

19. The battery of claim 14 wherein the nanoparticles of electroactive material in the cathode have an average diameter from about 5 nm to about 50 nm.

20. The battery of claim 14 wherein the nanoparticles of electroactive material in the cathode comprises crystalline $V_2O_5$.

21. The battery of claim 14 wherein the cathode further comprises supplementary electrically conductive particles.

22. The battery of claim 18 wherein intercalation compound within the anode comprises carbon.

23. The battery of claim 14 wherein the anode comprises lithium metal.

24. The battery of claim 14 wherein the separator comprises a porous polymer material.

* * * * *